(12) United States Patent
Song et al.

(10) Patent No.: US 9,792,586 B2
(45) Date of Patent: Oct. 17, 2017

(54) SYSTEM AND METHOD FOR PERCEIVING OUTCAST IN GROUP

(71) Applicant: KOREA ADVANCED INSTITUTE OF SCIENCE AND TECHNOLOGY, Daejeon (KR)

(72) Inventors: June Hwa Song, Daejeon (KR); In Seok Hwang, Daejeon (KR); Hyuk Jae Jang, Gyeonggi-do (KR); Tai Woo Park, Daejeon (KR); A Ram Choi, Daejeon (KR); Young Ki Lee, Daejeon (KR); Chan You Hwang, Daejeon (KR)

(73) Assignee: KOREA ADVANCED INSTITUTE OF SCIENCE & TECHNOLOGY (KAIST), Daejeon (KR)

( * ) Notice: Subject to any disclaimer, the term of this patent is extended or adjusted under 35 U.S.C. 154(b) by 604 days.

(21) Appl. No.: 13/919,039

(22) Filed: Jun. 17, 2013

(65) Prior Publication Data
US 2014/0149509 A1 May 29, 2014

(30) Foreign Application Priority Data

Nov. 28, 2012 (KR) ........................ 10-2012-0136585

(51) Int. Cl.
*G06Q 10/10* (2012.01)
*G06Q 50/00* (2012.01)
(52) U.S. Cl.
CPC ............. *G06Q 10/10* (2013.01); *G06Q 50/01* (2013.01)
(58) Field of Classification Search
CPC ................................. G06Q 10/10; G06Q 50/01
(Continued)

(56) References Cited

U.S. PATENT DOCUMENTS

2008/0201164 A1* 8/2008 Suzuki .................. G06Q 10/06
705/1.1
2013/0050244 A1* 2/2013 Kim .................. G08B 21/0227
345/589

(Continued)

FOREIGN PATENT DOCUMENTS

JP 2007194801 A * 8/2007

OTHER PUBLICATIONS

IP.com, English Translation of JP 2007194801 A, Oct. 7, 2015, 7 pages.*

*Primary Examiner* — Wing F Chan
*Assistant Examiner* — Leon Y Tseng
(74) *Attorney, Agent, or Firm* — Cho-Won IP Consulting; Hyun Ho Song

(57) ABSTRACT

Provided is a system and method for perceiving an outcast in a group. The system may include: a plurality of member terminals held, respectively, by a plurality of members conducting an outdoor activity and configured to transmit waves with a radio frequency; and a leader terminal held by a leader of the outdoor activity and configured to receive the waves transmitted from the plurality of member terminals, to sense intensities of the waves, to obtain distances between the plurality of member terminals from the sensed intensities of the waves, to calculate a group distance based on the obtained distances between the member terminals, to sort the plurality of member terminals into at least one subgroup, and to determine an outcast member terminal excluded from the at least one subgroup.

2 Claims, 3 Drawing Sheets

(58) Field of Classification Search
USPC .......................................................... 709/204
See application file for complete search history.

(56) References Cited

U.S. PATENT DOCUMENTS

2013/0073422 A1* 3/2013 Moore .................... G06Q 10/10
    705/26.7
2013/0185359 A1* 7/2013 Liu .......................... H04L 67/24
    709/204

* cited by examiner

SYSTEM AND METHOD FOR PERCEIVING OUTCAST IN GROUP

CROSS-REFERENCE TO RELATED APPLICATION

This application claims priority of Korean Patent Application No. 10-2012-0136585, filed on Nov. 28, 2012, in the KIPO (Korean Intellectual Property Office), the disclosure of which is incorporated herein entirely by reference.

BACKGROUND OF THE INVENTION

Field of the Invention

The present disclosure relates to a system and method for perceiving an outcast in a group, and more particularly, to a system and method for perceiving an outcast in a group that may perceive an outcast based on a period of time of joining a subgroup during an outdoor activity.

Description of the Related Art

Recently, bullying is at issue in society. An outcast refers to a victim bullied by other members in a group. As a bullying behavior of a severer level than ostracism, for example, an emotional abuse or use of violence occurs frequently, countermeasures are in an urgent need.

However, because ostracism often spreads in subtle and insidious forms, it is difficult for a leader responsible for guiding a group, for example, a teacher, to perceive this phenomenon. Further, when a leader guides a great number of members in a group, the leader has difficulty in perceiving an outcast.

SUMMARY OF THE INVENTION

The present disclosure is directed to providing a system for perceiving an outcast in a group to prevent bullying.

Another aspect of the present disclosure provides a method of perceiving an outcast in a group.

Accordingly, the system and method for perceiving an outcast in a group may enable a leader of a group to perceive an outcast in the group, during an outdoor activity, in an early stage and to take an action to prevent bullying in an initial stage.

BRIEF DESCRIPTION OF THE DRAWINGS

The above and other features and advantages will become more apparent to those of ordinary skill in the art by describing in detail exemplary embodiments with reference to the attached drawings, in which.

In the following description, the same or similar elements are labeled with the same or similar reference numbers.

DETAILED DESCRIPTION

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes", "comprises" and/or "comprising," when used in this specification, specify the presence of stated features, integers, steps, operations, elements, and/or components, but do not preclude the presence or addition of one or more other features, integers, steps, operations, elements, components, and/or groups thereof. In addition, a term such as a "unit", a "module", a "block" or like, when used in the specification, represents a unit that processes at least one function or operation, and the unit or the like may be implemented by hardware or software or a combination of hardware and software.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Preferred embodiments will now be described more fully hereinafter with reference to the accompanying drawings. However, they may be embodied in different forms and should not be construed as limited to the embodiments set forth herein. Rather, these embodiments are provided so that this disclosure will be thorough and complete, and will fully convey the scope of the disclosure to those skilled in the art.

Figure 1:
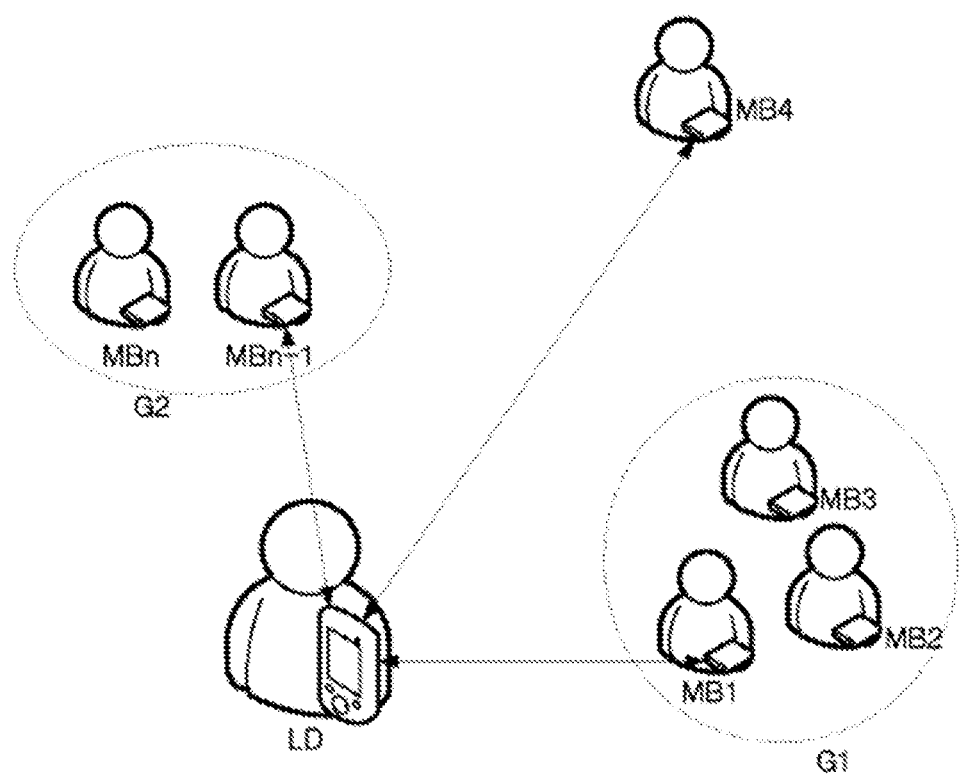
FIG. 1 is a diagram illustrating a system for perceiving an outcast in a group according to an exemplary embodiment.

FIG. 1 is a diagram illustrating a system for perceiving an outcast in a group according to an exemplary embodiment.

Referring to FIG. 1, the system for perceiving an outcast in a group according to an exemplary embodiment may include at least one leader terminal LD and a plurality of member terminals MB1 through MBn. The plurality of member terminals MB1 through MBn may be each held by a plurality of members in a group that may conduct an outdoor activity, and may transmit waves. The at least one leader terminal LD may be each held by at least one leader, may receive the waves transmitted from the plurality of member terminals MB1 through MBn, may sense intensities of the received waves, and may determine a distribution distance for each of the plurality of member terminals MB1 through MBn.

Seriousness of bullying, for example, personal insults and use of violence, consists in being done by a group. However, bullying in a group is insidious rather than abrupt. Often, bullying starts to take place in a member having difficulty in getting along with other members in a group, described as an outcast. As an outcast is ostracized or deliberately excluded by a pack of members in a group, bullying escalates to a more severe form. In the majority of cases, bullying tends to occur in a presence of an outcast in a group. Accordingly, when a leader perceives an outcast in an early stage and teaches the outcast to get along with other members in a group, bullying may be prevented in an initial stage.

Also, an outcast is often isolated and alone because the outcast does not join a group. Accordingly, there is a high possibility that a member getting alone away from a group for a long time corresponds to an outcast.

Primarily, bullying occurs among children and youth that spend most of time indoors, for example, in schools or kindergartens, and are generally allowed to study at a designated location during an education program, which makes it difficult to actually observe an outcast being isolated and alone.

Recently, educational institutions such as, for example, schools or kindergartens, support various educational field trips including, for example, outdoor activities such as a museum visit, an outing, a field day, and the like. During outdoor activities, members in a group may disperse and gather freely, without being designated to a particular study location, in an expanded activity space when compared to an indoor space such as a classroom, and in most cases, may form a plurality of subgroups. Experiment results demonstrate that during an outdoor activity, in particular, during a move, students certainly tend to form subgroups with intimate friends. When a member does not join a subgroup during an outdoor activity, the member may be determined to be an outcast. However, during an outdoor activity, a leader is responsible for safety of a plurality of members in the group as well as management of education. The leader does not have as much attention as to perceive an outcast. Perceiving an outcast only with a personal capability of a leader is difficult. Accordingly, the system of FIG. 1 may statistically extract an outcast member that does not belong to a subgroup within a group of members.

Because the plurality of member terminals MB1 through MBn are each held by a plurality of members, when a member terminal is detected to be isolated a predetermined distance or more away from the other member terminals, a member corresponding to the detected member terminal may be determined to be an outcast. In FIG. 1, a member corresponding to a member terminal MB4 that does not belong to two subgroups G1 and G2 may correspond to an outcast.

As described in the foregoing, the leader terminal LD may determine a distribution distance for each of the plurality of member terminals MB1 through MBn. Also, the leader terminal LD may calculate distances between the plurality of member terminals MB1 through MBn from the determined distribution distances of the plurality of member terminals MB1 through MBn. Also, the leader terminal LD may calculate a group distance from the calculated distances between the member terminals, and may form a subgroup with member terminals distributed within the group distance among the plurality of member terminals MB1 through MBn. Also, the leader terminal LD may determine an unattached member terminal that is not included in the subgroup, and may measure a period of time over which the unattached member terminal is not included in the subgroup. When a ratio of the period of time, over which the unattached member terminal is not included in the subgroup, relative to a total period of outdoor activity is greater than or equal to a preset reference period, the unattached member terminal may be determined to be an outcast member terminal.

The group distance may be set to a fixed value, but in this example, may be set to a variable value changing depending on the distances between the plurality of member terminals MB1 through MBn. This is because the members may be densely populated or sparsely distributed as an outdoor activity environment changes. For example, in a case of a museum visit, members of a subgroup may be densely populated for each of various exhibitions, however, in a case of a playground activity, members of a subgroup may be sparsely distributed. Accordingly, the group distance, namely, a criterion for determining whether a subgroup is formed, may be changed adaptively depending on a change in outdoor activity environment.

The plurality of member terminals MB1 through MBn may be attached to a device being commonly carried by the members of the group conducting an outdoor activity. For example, when the members of the group are students or kindergartners, the member terminals MB1 through MBn may be attached to a bag. Also, the leader terminal LD may be implemented as a single device, but may be implemented as a plurality of devices separately based on functions. When the leader terminal LD is implemented as a plurality of devices, at least one of the plurality of devices may be implemented in a form of a software program that may be installed on a mobile terminal owned by the leader.

Figure 2:
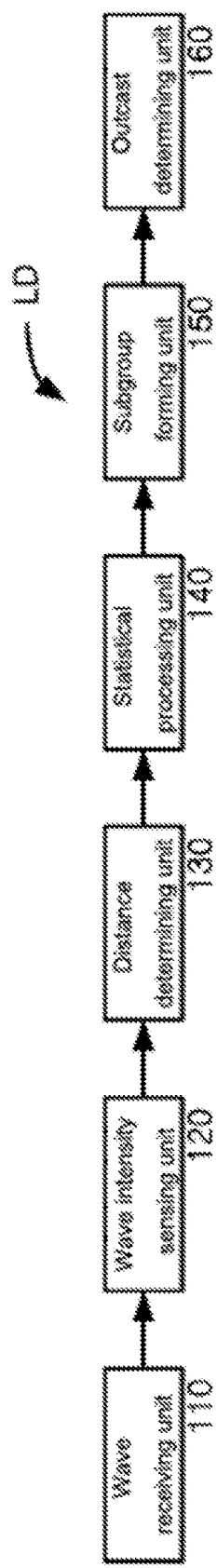
FIG. 2 is a diagram illustrating an example of a detailed configuration of a leader terminal of FIG. 1.

FIG. 2 is a diagram illustrating an example of a detailed configuration of the leader terminal LD of FIG. 1.

Referring to FIG. 2, the leader terminal LD may include a wave receiving unit 110, a wave intensity sensing unit 120, a distance determining unit 130, a statistical processing unit 140, a subgroup forming unit 150, and an outcast determining unit 160.

The wave receiving unit 110 may receive waves transmitted from the plurality of member terminals MB1 through MBn. The wave receiving unit 110 may receive waves in a preset frequency band, and in this example, may be set to receive waves in a radio frequency band, for example, in a range of 1 hertz (Hz) to 100 Hz.

The wave intensity sensing unit 120 may analyze intensities of the waves transmitted from the plurality of member terminals MB1 through MBn, and the distance determining unit 130 may determine distances of the plurality of member terminals MB1 through MBn using a strength of a received signal. A method of determining a distance of a transmitting terminal using a strength of a received signal is well known in the art, and among various techniques, a received signal strength indicator (RSSI) technique may be applied to an exemplary embodiment.

The statistical processing unit 140 may obtain an average distance through statistical processing of the distances determined by the distance determining unit 130 for the plurality of member terminals MB1 through MBn, and may calculate a group distance to be proportional to the obtained average distance. The average distance may refer to an average of distances between the plurality of member terminals MB1 through MBn, rather than an average of distances from the leader terminal LD to the plurality of member terminals MB1 through MBn. The group distance may correspond to a value changing in proportion to the average distance at a preset ratio, and a default value may be preset. The group distance may be used to distinguish subgroups, and may be set to a value less than the average distance.

The subgroup forming unit 150 may divide the plurality of member terminals into member terminals having a distance between the member terminals within the calculated group distance, referred to as a subgroup terminal, for example, in FIG. 1, member terminals MB1 through MB3 and member terminals MBn−1 and MBn. The subgroup forming unit 150 may form a subgroup with member terminals placed adjacent to one another within the group distance among the plurality of member terminals.

When members conduct an outdoor activity in units of subgroups, a distance between members of a subgroup may be very short, but a distance between subgroups may be relatively long. Accordingly, as described in the foregoing, when the group distance is calculated based on an average of distances between individual member terminals, an outcast member terminal may be accurately determined.

The outcast determining unit 160 may determine an unattached member terminal that is not sorted into a subgroup terminal as a result of the subgrouping by the subgroup forming unit 150, and may measure a period of time over which a corresponding terminal exists as an unattached member terminal. When a ratio of the period of time, over which the corresponding terminal exists as an unattached member terminal, relative to a total period of outdoor activity is greater than or equal to a preset reference ratio, the outcast determining unit 160 may determine the terminal to be an outcast member terminal.

The goal of the outcast determining unit 160 comparing the period of time over which a member terminal exists as an unattached member terminal to the total period of outdoor activity may be to accurately determine an outcast member terminal. During an outdoor activity, even a subgroup terminal joining a subgroup may get out of the subgroup when a corresponding member goes to a toilet or goes to do a personal business. In contrast, even an outcast may be gathered with other members for a roll call or study. Temporary separation from a subgroup or joining the subgroup may occur frequently. This temporary phenomenon may contribute to inaccurate determination of an outcast. Accordingly, presence or absence of an outcast member terminal may be determined by calculating a ratio of a period of time, over which a member terminal exists as an unattached member terminal, relative to a total period of outdoor activity. For this purpose, the leader terminal LD may further include a timer. The leader terminal LD may run the timer from the start of an outdoor activity until a command given by the leader is applied, to determine an outcast member terminal.

Although not shown, the leader terminal LD may further include an output unit to promptly output information associated with the outcast member terminal. When information associated with members corresponding, respectively, to the plurality of member terminals MB1 through MBn is stored in the leader terminal LD, information associated with the outcast member terminal may be also provided. This is possible because the leader terminal LD may identify the plurality of member terminals MB1 through MBn based on a preset identification (ID).

Figure 3:
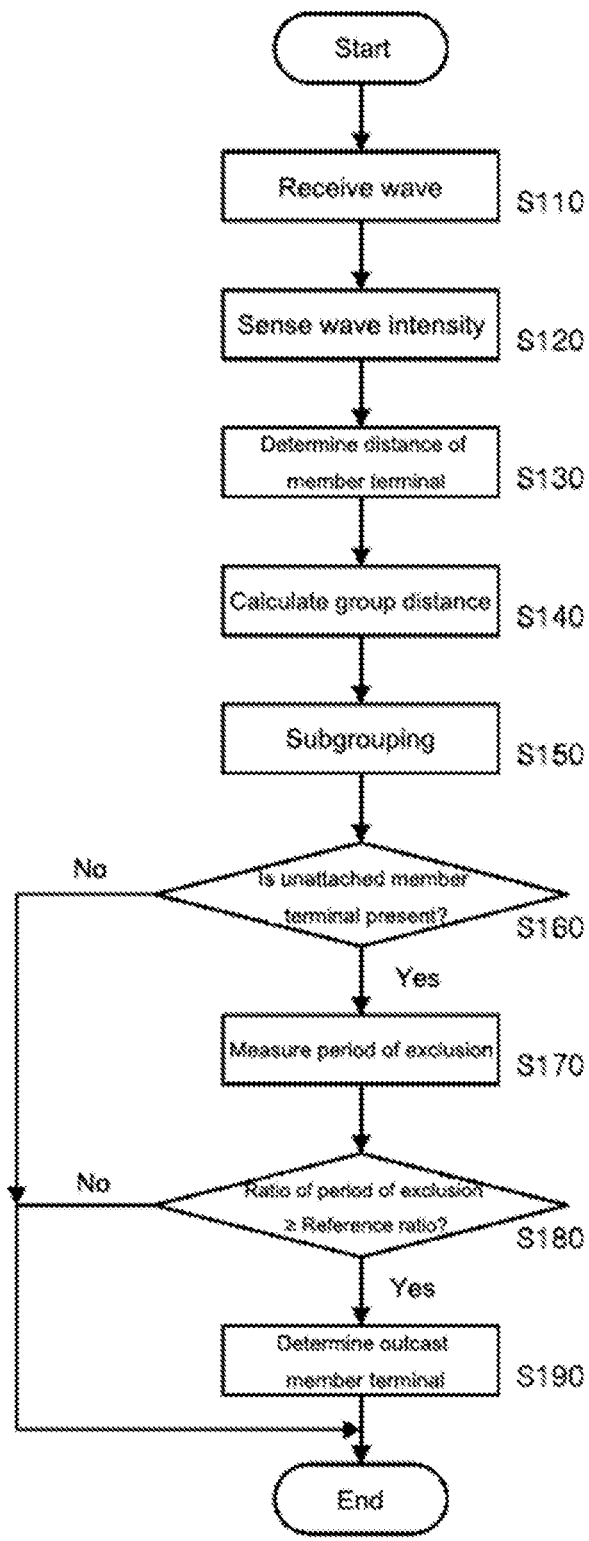
FIG. 3 is a flowchart illustrating a method of perceiving an outcast in a group according to an exemplary embodiment.

FIG. 3 is a flowchart illustrating a method of perceiving an outcast in a group according to an exemplary embodiment.

Hereinafter, description is based on operation of the leader terminal LD of FIG. 2. Referring to FIG. 3, the leader terminal LD may receive waves transmitted from the plurality of member terminals MB1 through MBn (S110). Then, the leader terminal LD may sense intensities of the waves received for a predetermined period of time, for example, five seconds (S120). The wave intensity may be measured as an average intensity during a preset period of time. When the wave intensity is measured, the leader terminal LD may determine distances between member terminals for each of the plurality of member terminals MB1 through MBn based on the measured wave intensity (S130). A method of estimating a distance of a terminal from a wave intensity is well known in the art, and in this example, an RSSI technique may be used.

When the distances between the member terminals are determined, the leader terminal LD may calculate a group distance (S140). The group distance may be calculated based on an average distance between the member terminals. In this example, a reference distance may be calculated to be proportional to the average distance by, for example, 0.2.

When the group distance is calculated, the leader terminal LD may divide the plurality of member terminals MB1 through MBn into member terminals placed adjacent to one another within the group distance, also known as a subgroup terminal (S150). Then, the leader terminal LD may determine whether an unattached member terminal not included in a subgroup or not sorted into a subgroup terminal is present (S160). When the unattached member terminal is determined to be present, the leader terminal LD may measure a period of time over which the unattached member terminal is not included in the subgroup (S170).

Then, the leader terminal LD may convert the measured period of exclusion into a ratio to a total period of outdoor activity, and may determine whether the ratio of the period of exclusion to the total period of outdoor activity is greater than or equal to a preset reference ratio (S180). When the ratio of the period of exclusion to the total period of outdoor activity is greater than or equal to the present reference ratio, the corresponding unattached member terminal may be determined to be an outcast member terminal (S190).

In the foregoing description, a plurality of member terminals may be divided into subgroups, a member terminal not included in a subgroup may be determined to be an unattached member terminal, and a period of time over which the member terminal is included in the subgroup may be measured. However, during an outdoor activity, all members may be gathered together and may be distributed at a uniform distance. For all the plurality of member terminals MB1 through MBn, when a distance between member terminals is uniform or within a preset predetermined distance, for example, three meters, it may be determined that members are lined up according to an instruction of a leader and the like, and subgrouping may not be performed. For a time section in which subgrouping is not performed, a period of time of exclusion may not be measured and may be excluded from a total period of outdoor activity. Even though subgrouping is performed, a case in which a preset percentage, for example, 10%, of all the member terminals are determined to be an unattached member terminal, or a case in which all the member terminals are included in one subgroup, may be determined to be a specific situation in an outdoor activity environment, and a period of exclusion may not be measured and may be excluded from a total period of outdoor activity.

As described in the foregoing, the system and method for perceiving an outcast in a group may measure distances between member terminals each held by a plurality of members conducting an outdoor activity, may calculate a group distance based on an average of the measured distances, may divide into member terminals having a distance between the member terminals within the group distance, and may determine an outcast member terminal by measuring a period of time over which an unattached member terminal is not included in a subgroup. The outcast member terminal may be distinguished and displayed, so that a leader of a group may perceive an outcast in the group in an early stage and may prevent bullying in an initial stage.

The method according to an exemplary embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an exemplary embodiment may be written as a computer program transmitted over a computer-readable transmission medium, such as a carrier wave, and received and implemented in general-use or special-purpose digital computers that execute the programs.

While the present disclosure has been described with reference to the embodiments illustrated in the figures, the embodiments are merely examples, and it will be understood by those skilled in the art that various changes in form and other embodiments equivalent thereto can be performed. Therefore, the technical scope of the disclosure is defined by the technical idea of the appended claims The drawings and the forgoing description gave examples of the present invention. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A method of perceiving an outcast in a group from a system for perceiving an outcast in a group, the system comprising a plurality of member terminals held, respectively, by a plurality of members conducting an outdoor activity to transmit waves with a radio frequency, and a leader terminal held by a leader of the outdoor activity, the method comprising:

receiving, using the leader terminal, the waves transmitted from the plurality of member terminals;

sensing intensities of the received waves;

obtaining distances between the plurality of member terminals from the sensed intensities of the waves;

calculating a group distance based on the obtained distances between the plurality of member terminals;

forming at least one subgroup with member terminals having a distance between the member terminals within the calculated group distance among the plurality of member terminals to thereby subdivide the plurality of member terminals into the at least one subgroup, which includes adjacent member terminals located within the calculated group distance with respect to one another; and determining an outcast member terminal by determining whether an unattached member terminal excluded from the at least one subgroup is present among the plurality of member terminals, wherein the calculating of the group distance comprises:

calculating distances between each of the plurality of member terminals with respect to another one or with respect to the leader terminal, and an average distance of the distances between the plurality of member terminals based on the determined distances of the plurality of member terminals; and calculating a group distance to be proportional to the average distance, wherein the determining the outcast member terminal comprises:

measuring a period of time over which the unattached member terminal is excluded from the subgroup;

determining whether a ratio of the period of exclusion to a total period of the outdoor activity is greater than or equal to a preset reference ratio; and determining the unattached member terminal to be an outcast member terminal when the ratio of the period of exclusion to the total period of the outdoor activity is greater than or equal to the preset reference ratio, wherein in the step of calculating of the period of exclusion, in a time section when all of the plurality of member terminals are included in one subgroup or a ratio of the unattached member terminal to the plurality of member terminals is greater than or equal to a preset ratio, the period of exclusion is not measured during the time section, and the time section is excluded from the total period of outdoor activity.

2. The method for perceiving an outcast in a group of claim 1, wherein when the distance between the plurality of member terminals is within a preset/predetermined distance:

the step of forming at least one subgroup is not performed, and the period of exclusion is not measured during corresponding time section when the at least one subgroup is not formed, and the time section is excluded from the total period of outdoor activity.

* * * * *